(12) United States Patent
Hernandez et al.

(10) Patent No.: US 6,755,078 B2
(45) Date of Patent: Jun. 29, 2004

(54) METHODS AND APPARATUS FOR ESTIMATING THE TEMPERATURE OF AN EXHAUST GAS RECIRCULATION VALVE COIL

(75) Inventors: Claudio A. Hernandez, Farmington Hills, MI (US); Daniel G. Brennan, Brighton, MI (US); Gregory J. York, Fenton, MI (US); Donald W. Harnack, Livonia, MI (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 10/355,898

(22) Filed: Jan. 31, 2003

(65) Prior Publication Data

US 2003/0226398 A1 Dec. 11, 2003

Related U.S. Application Data

(63) Continuation-in-part of application No. 10/166,807, filed on Jun. 11, 2002.

(51) Int. Cl.$^7$ .............................................. G01M 19/00
(52) U.S. Cl. ........................ 73/118.1; 73/117.2; 73/116
(58) Field of Search ................................ 73/118.1, 116, 73/117.2, 117.3, 118.2, 23.31, 23.32, 25.01; 137/480, 478

(56) References Cited

U.S. PATENT DOCUMENTS

| | | | | |
|---|---|---|---|---|
| 5,722,236 A | * | 3/1998 | Cullen et al. ................... | 60/274 |
| 6,047,690 A | | 4/2000 | Field et al. ............... | 123/568.2 |
| 6,116,083 A | * | 9/2000 | Cullen et al. ............... | 73/118.1 |

* cited by examiner

Primary Examiner—Edward Lefkowitz
Assistant Examiner—Corey D. Mack
(74) Attorney, Agent, or Firm—Christopher DeVries

(57) ABSTRACT

An exhaust gas recirculation (EGR) valve coil temperature is estimated non-intrusively using only existing sensors. In one embodiment an EGR valve coil temperature estimator running on a powertrain control module estimates the EGR valve coil temperature as a linear function of estimated charge temperature, inlet air temperature, coolant temperature, and vehicle speed. Coefficients of the mathematical function, which describe the degree of association between the inputs and EGR valve coil temperature, are calculated by measuring the actual EGR valve coil temperature over wide operating conditions. The powertrain control module uses the EGR valve temperature estimated in this manner to vary the drive signal to the EGR valve coil to open the EGR valve a desired amount.

19 Claims, 9 Drawing Sheets

METHODS AND APPARATUS FOR ESTIMATING THE TEMPERATURE OF AN EXHAUST GAS RECIRCULATION VALVE COIL

CROSS-REFERENCE TO RELATED APPLICATION

This application is a continuation-in-part of prior application Ser. No. 10/166,807, filed Jun. 11, 2002.

TECHNICAL FIELD

This invention relates generally to automotive engine controls, and more particularly to a method for estimating the temperature of an exhaust gas recirculation (EGR) valve coil and related apparatus.

BACKGROUND OF THE INVENTION

Exhaust gas recirculation (EGR) is a process in automotive engines that allows a controlled amount of oxygen-depleted exhaust gas to be mixed with inlet air flowing into an engine for combustion in the cylinders of the engine. Electrically actuated EGR valves are used to control the amount of exhaust gas that is re-introduced into the engine. The EGR valve position is controlled by driving a coil in the EGR valve appropriately. As the temperature of the engine changes, the temperature and electrical properties of the EGR valve coil also change. In order to properly drive the EGR valve coil to attain the desired displacement, it is important to periodically determine the temperature of the EGR valve coil and use this temperature to modify the electrical signal used to drive it.

One known technique of compensating for changes in the EGR valve coil temperature opens the EGR valve during engine idle, a period in which the EGR valve is normally closed. However this method is intrusive and can impact emissions. This method also can impact the quality of the idle operation of the vehicle.

In order to avoid these problems, it is possible to use certain windowing criteria to avoid detection by the driver. However, these windowing criteria can also cause problems, and in some vehicles cause the compensation estimation to fail to update the coil temperature. The result is not only rough idling but also poor emissions performance.

What is needed then is a non-intrusive apparatus for updating the EGR valve temperature that does not cause a rough idle condition and does not worsen emissions. Such an apparatus and related method are provided by the present invention, whose features and advantages will be more clearly understood from the following detailed description taken in conjunction with accompanying drawings.

SUMMARY OF THE INVENTION

In accordance with an embodiment of the present invention, the temperature of an EGR valve coil is estimated using only inputs from existing sensors and a model of the relationship between those sensors and EGR valve temperature. This temperature estimation enables continuous prediction of coil temperature under all operating conditions, improving the control of exhaust gas recirculation. The technique improves the vehicle fuel economy and emission performance. Since the technique is non-intrusive, it does not affect emissions and does not impact drivability by creating rough idles. It employs existing sensors to predict the coil temperature, eliminating the need for separate sensors. In addition, the model of this technique is easier to calibrate than other known temperature estimation techniques.

In one embodiment, the temperature is estimated by receiving a charge temperature estimate, an engine inlet air temperature, and a coolant temperature and forming a steady-state EGR valve coil temperature estimate as a linear function of the charge temperature estimate, the engine inlet air temperature, and the coolant temperature.

Such a temperature estimate may be accomplished by an apparatus including first, second, and third multiplication elements and a summing device. The first multiplication element has an input for receiving a charge temperature estimate, and an output, and has a first coefficient associated therewith. The second multiplication element has an input for receiving an engine inlet air temperature, and an output, and has a second coefficient associated therewith. The third multiplication element has an input for receiving a coolant temperature, and an output, and has a third coefficient associated therewith. The summing device has a first input coupled to the output of said first multiplication element, a second input coupled to the output of said second multiplication element, a third input coupled to the output of said third multiplication element, and an output for providing a steady-state EGR valve coil temperature estimate.

BRIEF DESCRIPTION OF THE DRAWINGS

The present invention will hereinafter be described in conjunction with the appended drawing figures, wherein like numerals denote like elements, and.

DESCRIPTION OF THE PREFERRED EMBODIMENT

The following detailed description of the drawings is exemplary in nature and is not intended to limit the invention or the application or use of the invention. Furthermore, there is no intention to be bound by any theory presented in this detailed description of the drawings.

Figure 11:
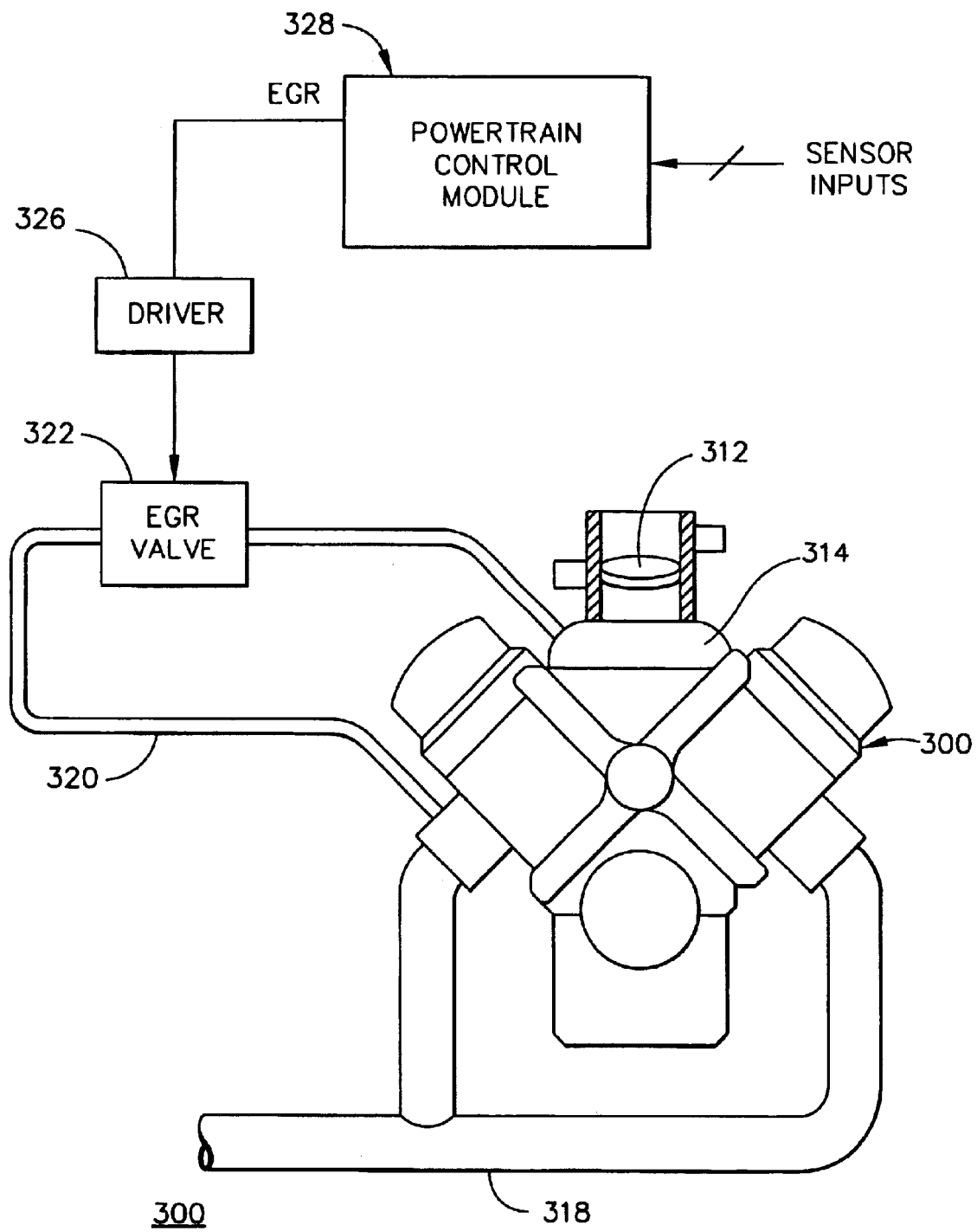
FIG. 11 illustrates a diagram of an automotive engine having an EGR valve in accordance with a preferred embodiment of the present invention.

Referring now to FIG. 11, an internal combustion engine 300 receives inlet air through inlet air valve 312, such as a conventional butterfly valve. Inlet air passes to an engine intake manifold 314. Engine cylinder exhaust gas generated through operation of engine 300 passes from the engine cylinders (not shown) through exhaust conduit 318 to a conventional catalytic treatment device (not shown). A portion of the exhaust gas is recirculated through conduit 320, opening on a first end to conduit 318 and on a second end, opposing the first end, to an EGR valve 322, such as a conventional electromagnetic solenoid valve, linear solenoid valve, or sonic flow solenoid valve, to selectively meter recirculated exhaust gas provided to intake manifold 314.

A powertrain control module PCM 328, such as a 16-bit microcontroller, is provided including conventional controller elements, such as a central processing unit, read only memory, random access memory, input/output units, and other units generally known in the art to be used for vehicle control operations. PCM 328 performs a series of procedures whereby input signals are sampled through conventional operations, such as conventional analog to digital converter sampling operations, whereby multiple inputs SENSOR INPUTS are received and converted to a form suitable for digital processing. In response to the SENSOR INPUTS, PCM 328 generates a series of actuator commands, including signal EGR, in response thereto for carrying out engine control and diagnostic operations.

More specifically, PCM 328 issues a pulse width modulated (PWM) position control signal EGR to an EGR valve driver 326, such as a conventional current control circuit, for driving the EGR valve 322 at a desired duty cycle for precise control of the amount of recirculated exhaust gas delivered to intake manifold 314. The degree of opening of EGR valve 322 varies as the magnitude of the position control signal varies. As the duty cycle of position control signal EGR increases, the current sent to the magnetic coil (not shown) of EGR valve 322 increases. The increase in current applied to the magnetic coil of EGR valve 322 causes the magnetic force within the valve to increase, driving the EGR valve pintle (not shown) away from a rest position. As the EGR valve pintle moves away from the rest position, the degree of opening of EGR valve 322 increases, increasing, for given operating conditions, the flow rate of exhaust gas through conduit 320.

The duty cycle of the EGR position control signal is determined by PCM 328 through a series of procedures. These procedures are stored as a series of software routines periodically executed while the PCM 328 is operating. PCM 328 changes the operation of these procedures as the temperature of the EGR valve coil changes to account for the change in electrical resistance. In accordance with the present invention engine 300 does not measure the temperature of the coil in EGR valve 322 directly with a thermocouple, or indirectly during an idle period. Rather, PCM 328 estimates the temperature from other system values, and then uses the estimated temperature to alter the duty cycle of signal EGR accordingly.

The EGR valve coil estimation method described herein does not require the use of any new sensors. Thus, SENSOR INPUTS only includes inputs from sensors already present in the vehicle. According to the illustrated embodiment, SENSOR INPUTS includes a signal indicative of the temperature of the engine coolant, $T_{cool}$, a signal v indicative of the speed of the vehicle, and a signal indicative of the engine inlet air temperature, $T_{air}$. Furthermore, the method uses an estimate of the charge temperature, $T_{CH}$, formed as described with reference to FIGS. 1–9 below.

Figure 1:
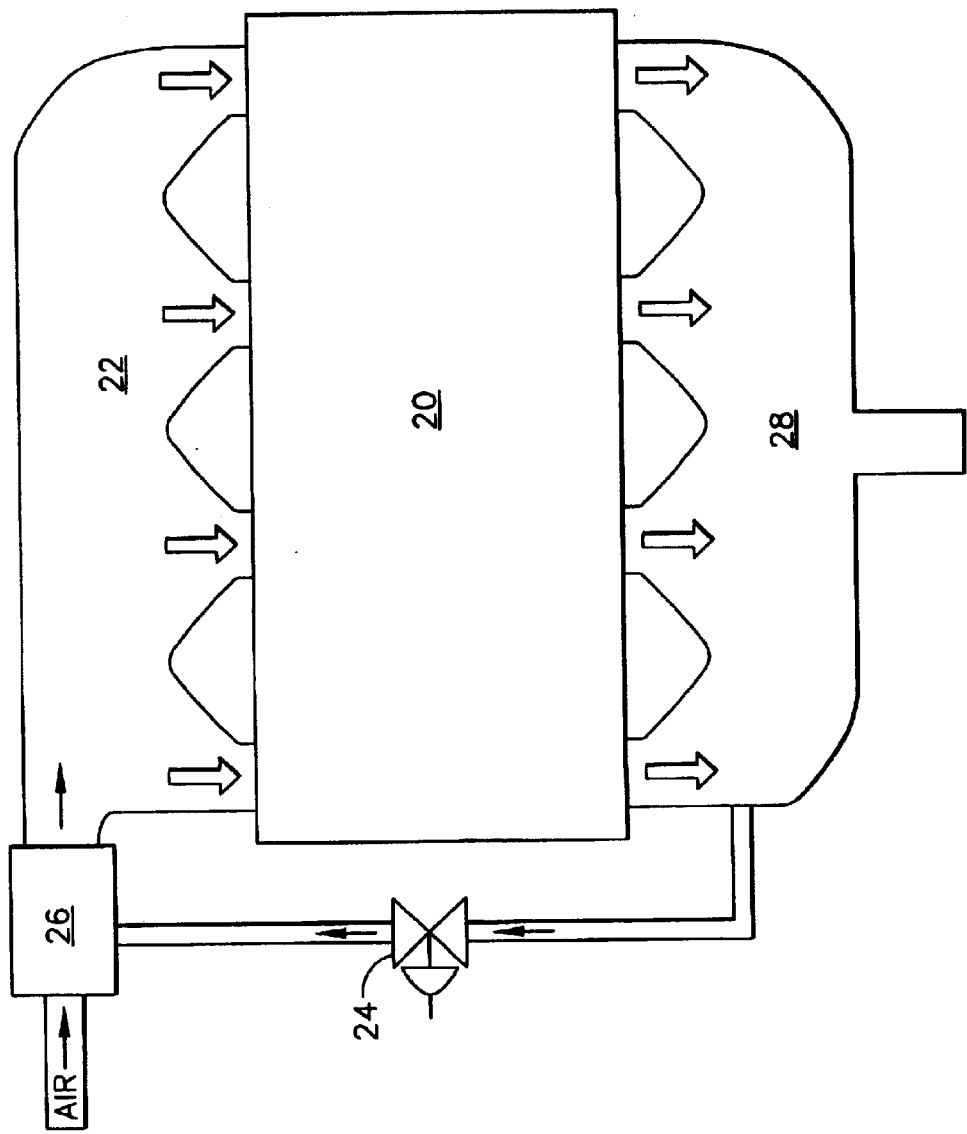
FIG. 1 is a simplified illustration of an engine in which temperatures are estimated in accordance with the apparatus and/or methods of the present invention.

FIG. 1 is a simplified illustration of an engine 20 in which gas temperatures are estimated with the apparatus and/or methods of the present invention. The apparatus and methods of the present invention can be configured to estimate gas temperatures at any number of locations within an engine of a land (e.g., automobiles, trains), air (e.g., aircraft), water (e.g., ships), and space vehicle. For example, and according to a preferred embodiment of the present invention, the apparatus and methods of the present invention can be configured to estimate gas temperatures within an internal combustion engine, and more preferably the gas temperatures within an internal combustion engine at or within the vicinity of the intake manifold 22 (i.e., the charge gas temperature), the EGR valve 24 (i.e., the EGR gas temperature at the EGR valve), the throttle body 26 (i.e., the EGR gas temperature at the throttle body), and/or the exhaust manifold 28 (i.e., the exhaust gas temperature). One or more of these estimated gas temperatures can be utilized for any number of purposes such as for use in an engine control strategy for controlling engine operating parameters (e.g., engine intake air and injected fuel) to balance engine-operating goals (e.g., low emissions, high fuel economy, and high engine performance).

Figure 2:
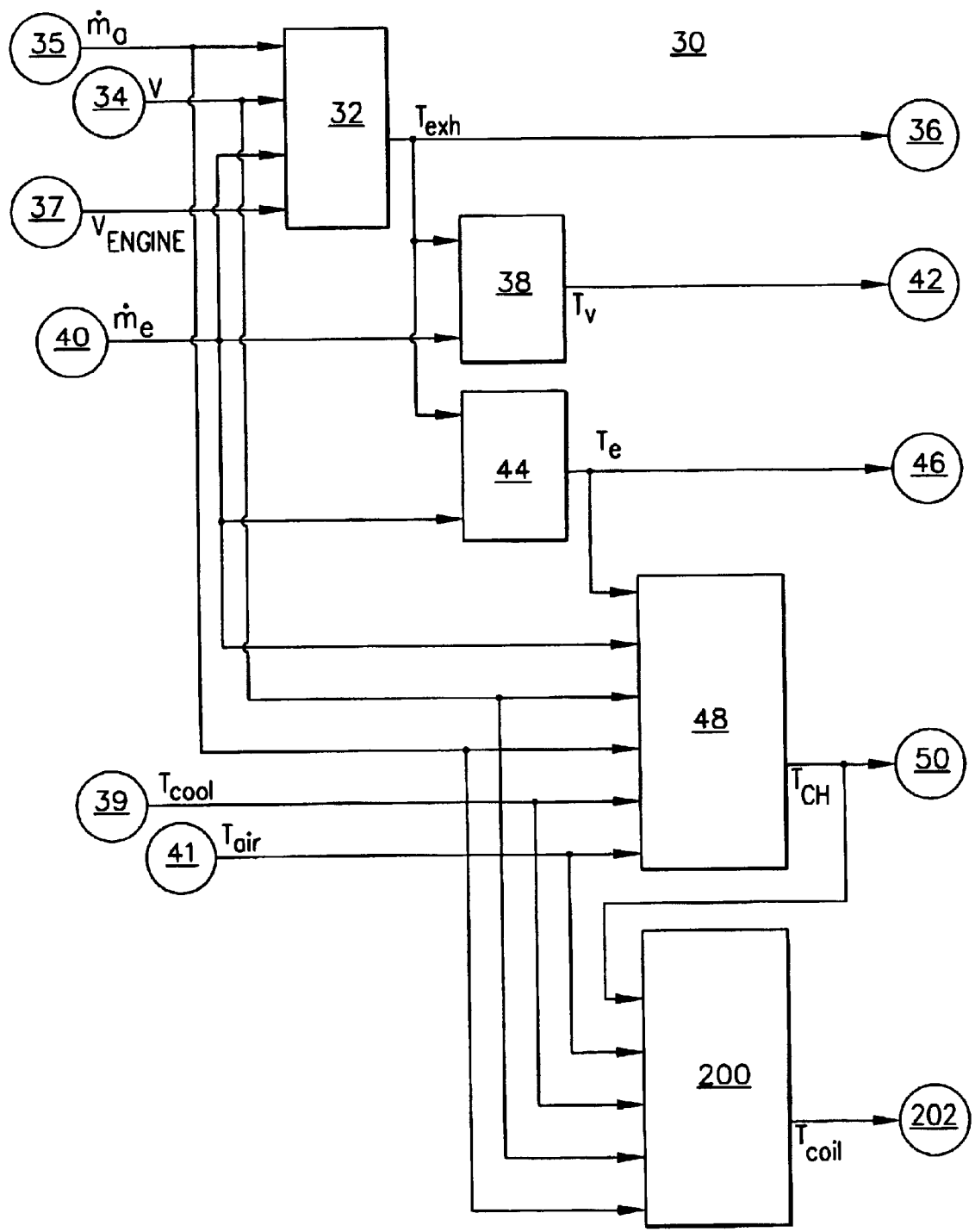
FIG. 2 is an apparatus for estimating the temperatures of an engine of a vehicle in accordance with a preferred exemplary embodiment of the present invention.

Referring to FIG. 2, an apparatus 30 is illustrated according to a preferred exemplary embodiment of the present invention for estimating gas temperatures within an engine of a vehicle, such as the engine 20 shown in FIG. 1. The apparatus 30 comprises an exhaust temperature estimator 32 that is configured to receive a velocity (v) of the vehicle provided at a velocity input 34, an air mass flow rate ($\dot{m}_a$) provided at an air mass flow rate input 35, an estimate of the EGR mass flow rate ($\dot{m}_e$) provided at an EGR mass flow rate input 40, and an engine velocity ($v_{engine}$) provided at an engine velocity input 37. The exhaust temperature estimator 32 is preferably configured to estimate an exhaust gas temperature ($T_{exh}$) within the exhaust manifold 28 of the engine 20 as illustrated in FIG. 1. The estimate of the exhaust gas temperature is based at least upon the velocity of the vehicle and the air mass flow rate, and also preferably based upon the estimate of the EGR mass flow rate and the engine velocity. The estimate of the exhaust gas temperature is provided as an output at an exhaust gas temperature output 36.

The apparatus 30 also comprises a first recirculated engine exhaust (EGR) gas temperature estimator 38 that is coupled to the exhaust gas temperature output 36 and configured to receive the exhaust gas temperature estimated by the exhaust temperature estimator 32. The first EGR gas temperature estimator 38 is also configured to receive the estimate of the EGR mass flow rate provided at the EGR mass flow rate input 40. The first EGR gas temperature estimator 38 is preferably configured to estimate an EGR gas temperature at the EGR valve ($T_V$), such as the EGR gas temperature at or within the vicinity of the EGR valve 24 of the engine 20 as illustratively shown in FIG. 1. The first EGR gas temperature estimator 38 estimates the EGR gas temperature at the EGR valve based at least upon the exhaust gas temperature and the estimate of the EGR mass flow-rate. The EGR gas temperature at the EGR valve is provided as an output at a first EGR temperature output 42.

Similarly, the apparatus 30 comprises a second EGR gas temperature estimator 44 that is also coupled to the exhaust gas temperature output 36 and also configured to receive the exhaust gas temperature estimated by the exhaust temperature estimator 32. The second EGR gas temperature estimator 44 is also configured to receive the estimate of the EGR mass flow rate provided at the EGR mass flow rate input 40. The second EGR gas temperature estimator 44 is preferably configured to estimate a second EGR gas temperature at the throttle body ($T_e$), such as the EGR gas temperature at or within the vicinity of the throttle body 26 of the engine 20 as illustratively shown in FIG. 1. The second EGR gas temperature estimator 44 estimates the EGR gas temperature at the throttle body based at least upon the exhaust gas temperature and the estimate of the EGR mass flow rate. The EGR gas temperature at the throttle body as estimated by the second EGR gas temperature estimator 44 is provided as an output at a second EGR temperature output 46.

In addition to the exhaust temperature estimator 32, the first EGR temperature estimator 38, and second EGR temperature estimator 44, the apparatus 30 comprises a charge temperature estimator 48 that is coupled to the second EGR temperature output 46 of the second EGR temperature estimator 44 and configured to receive the EGR gas temperature at the throttle body. In addition, the charge temperature estimator 48 is configured to receive the velocity of the vehicle provided at the velocity input 34, the air mass flow rate provided at the air mass flow rate input 35, the estimate of the EGR mass flow rate provided at the EGR mass flow rate input 40, an engine coolant temperature ($T_{cool}$) provided at the engine coolant temperature input 39, and an engine inlet air temperature ($T_{air}$) provided at the engine inlet temperature input 41. The charge temperature estimator 48 is configured to estimate a charge gas temperature ($T_{ch}$) based at least upon the EGR gas temperature of the throttle body, the velocity of the vehicle, the air mass flow rate, and the estimate of the EGR mass flow rate, and preferably based also on the engine coolant temperature and the engine inlet air temperature. The charge gas temperature generated by the charge temperature estimator 48 is provided as an output at a charge gas temperature output 50. As previously provided in this description of the detailed description of the drawings, the charge gas temperature, the exhaust gas temperature, first EGR gas temperature, second EGR gas temperature, and/or other temperatures within the engine, can be utilized for any number of engine control strategies, which can be implemented to control engine-operating parameters to balance engine-operating goals (e.g., low emissions, high fuel economy, and high engine performance).

The apparatus 30 further comprises an EGR valve coil temperature estimator 200 that is coupled to the charge gas temperature output 50 of the charge temperature estimator 48 and is configured to receive the velocity of the vehicle v provided at the velocity input 34, the air mass flow rate $\dot{m}_a$ provided at the air mass flow rate input 35, the engine coolant temperature ($T_{cool}$) provided at the engine coolant temperature input 39, and the engine inlet air temperature ($T_{air}$) provided at the engine inlet temperature input 41. The coil temperature generated by the coil temperature estimator 200 is provided as an output at a coil temperature output 202 that provides an instantaneous EGR valve coil temperature estimate signal $T_{coil}$.

Figure 3:
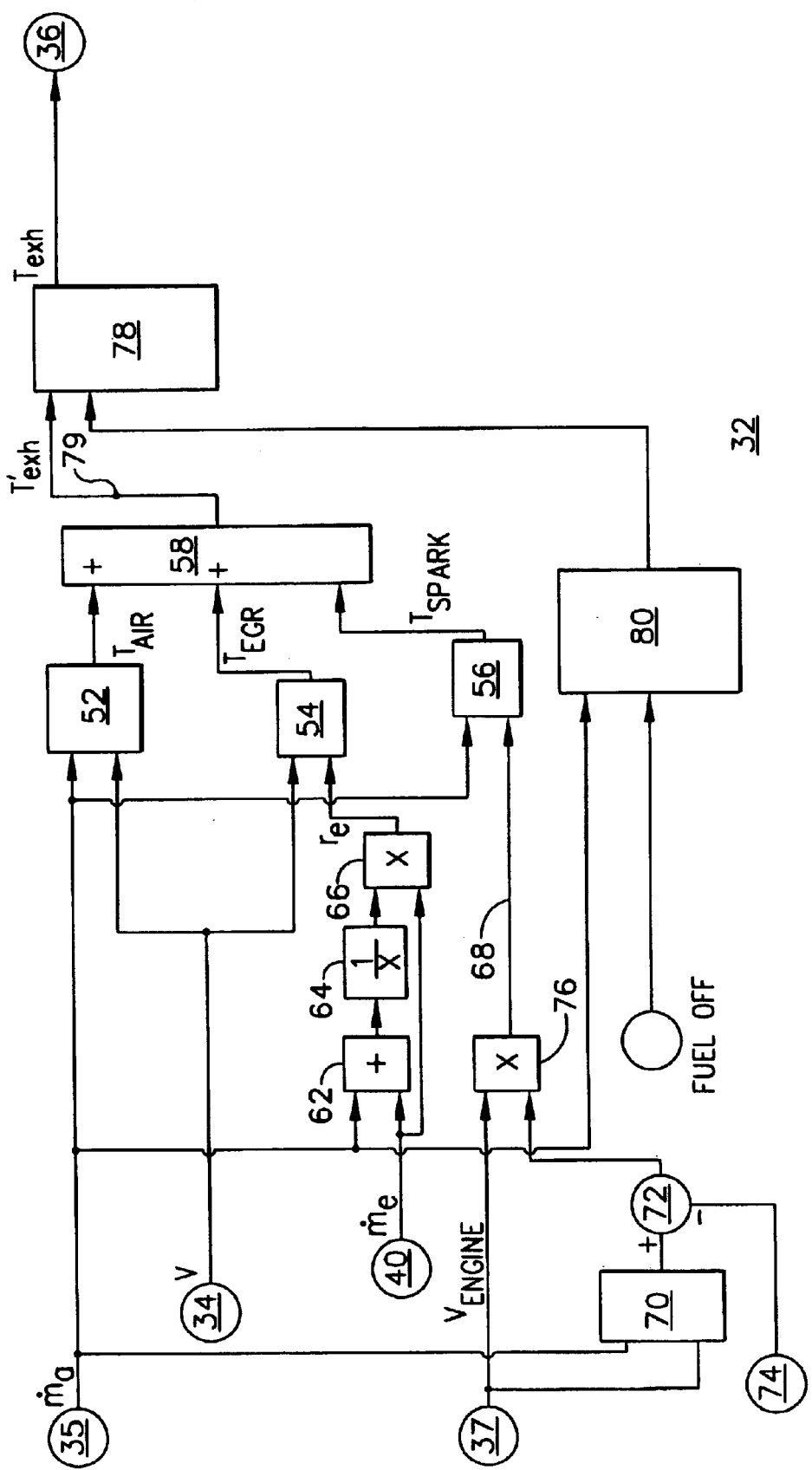
FIG. 3 is the exhaust temperature estimator of FIG. 2 in greater detail in accordance with a preferred exemplary embodiment of the present invention.

Referring to FIG. 3, the exhaust temperature estimator 32 of FIG. 2 is illustrated in greater detail according to a preferred exemplary embodiment of the present invention. In addition, Appendix A provides derivation details for the exhaust temperature estimator 32 according to the preferred exemplary embodiment of the present invention. However, as can be appreciated by one of ordinary skill in the art, other configurations and/or embodiments of the exhaust temperature estimator 32 can be used to estimate the exhaust gas temperature based at least upon the velocity of the vehicle and the air mass flow rate, and preferably also based upon the estimate of the EGR mass flow rate and the engine velocity. The exhaust temperature estimator 32, which can be implemented with software, hardware, or a combination of hardware and software, comprises an air temperature estimator 52, an EGR gas temperature estimator 54 and a spark effect determinator 56.

The air temperature estimator 52 is configured to estimate the air temperature ($T_{air}$), the EGR gas temperature estimator 54 is configured to estimate the EGR temperature ($T_{EGR}$), and the spark effect determinator 56 is configured to estimate the effect of engine spark on temperature (i.e., spark effect) ($T_{spark}$). The estimates of the air temperature, EGR temperature, and spark effect are provided to an exhaust temperature summer 58 that sums the air temperature estimate, EGR temperature estimate, and spark effect to produce the estimate of the exhaust gas temperature ($T'_{exh}$) as follows:

$$T'_{exh} = T_{air} + T_{EGR} + T_{spark} \tag{1}$$

The air temperature estimator 52, EGR gas temperature estimator 54, and spark effect determinator 56 are preferably lookup table operators that are used to determine the air temperature estimate, EGR temperature estimate, and the estimate of the effect of engine spark on temperature, which are non-linear functions.

More specifically, the air temperature estimate is a function of the air mass flow rate and velocity of the vehicle (i.e., $T_{air} = f(\dot{m}_a, v)$), the EGR temperature estimate is a function of the EGR ratio ($r_e$) and velocity of the vehicle (i.e., $T_{EGR} = f(r_e, v)$), and the spark effect is a function of air mass flow and engine speed ((i.e., $T_{spark} = f(m_a, v_{engine})$). In accordance with a preferred embodiment of the present invention, the lookup tables for the air temperature estimator 52, EGR gas temperature estimator 54 and/or spark effect determinator 56 are experimentally generated with techniques known to one of ordinary skill in the art. However, the lookup tables can be generated with other techniques known to one of ordinary skill in the art such as empirical calculation or the non-linear functions can be determined using techniques other than a look up operation, such as periodic calculations of the values.

The variables from which the air temperature estimator 52, EGR gas temperature estimator 54 and/or spark effect determinator 56 are configured to estimate the air temperature, EGR temperature and spark effect temperature, respectively, are a combination of measured values and calculated values from the measured values. The air mass flow and the velocity of the vehicle are preferably measured with sensors as known by one of ordinary skill in the art. The EGR ratio is calculated from the air mass flow and the estimate of the EGR mass flow rate that can be estimated according to any number of techniques known to one of ordinary skill in the art. Alternatively, the estimate of the EGR mass flow rate can be determined according to a technique of a preferred exemplary embodiment of the present invention as set forth in Appendix B.

Once the estimate of the EGR mass flow rate is determined according to the technique of a preferred exemplary embodiment of the present invention or according to any number of techniques known to one of ordinary skill in the art, the calculation of the EGR ratio is conducted with a summer 62, inverter 64, and multiplier 66 to perform the following mathematical operation:

$$r_e = \frac{\dot{m}_e}{\dot{m}_a + \dot{m}_e} \quad (2)$$

In addition, once the measured values of the air mass flow rate and velocity of the vehicle are received at the corresponding air mass flow rate input 35 and the velocity of the vehicle input 34, respectively, and the estimate of the EGR mass flow rate is received at the EGR mass flow rate input 40, the table look-up operation can be performed by the air temperature estimator 52 to determine the air temperature. Furthermore, the table look-up operation can be performed by the EGR gas temperature estimator 54 to determine the EGR temperature after the EGR ratio is calculated from the EGR mass flow rate and the air mass flow rate.

Before the effect of spark on temperature can be summed with the estimates of the air temperature and the EGR temperature to produce the exhaust temperature, the spark factor provided at the spark input 68 of the spark effect determinator 56 is determined from the air mass flow rate and the engine velocity. The spark factor is the product of the engine velocity and the difference between the actual torque of the engine and the Maximum Best Torque (MBT). The MBT is determined from an MBT determinator 70 that is preferably a lookup table operator. The MBT is a function of the air mass flow-rate and the engine velocity received at the air mass flow rate input 35 and the engine velocity input 37, respectively. In accordance with a preferred exemplary embodiment of the present invention, the MBT lookup table for the MBT determinator 70 is experimentally generated with techniques known to one of ordinary skill in the art. However, the MBT lookup table can be generated with other techniques know to one of ordinary skill in the art such as empirical calculation, or the MBT can be determined using techniques other than a look up operation, such as periodic calculations of the values.

The MBT determined by the MBT determinator 70 is presented to a subtractor 72, which also receives the actual engine torque received at an actual engine torque input 74, which is preferably measured or calculated with apparatus and techniques known to one of ordinary skill in the art. The actual torque is subtracted from the MBT and the result (i.e., the difference between the MBT and the actual torque) is multiplied by the engine speed with a multiplier 76 to produce the spark effect. The spark effect is presented to the spark effect determinator 56 with the air mass flow rate, and the spark effect temperature is determined by the spark effect determinator using the table lookup operation as previously described in this detailed description of the drawings. As also previously described in this detailed description of the drawings, the spark effect temperature, EGR temperature, and the air temperature are provided to the exhaust temperature summer 58 that sums the three values and produces the exhaust temperature.

Figure 4:
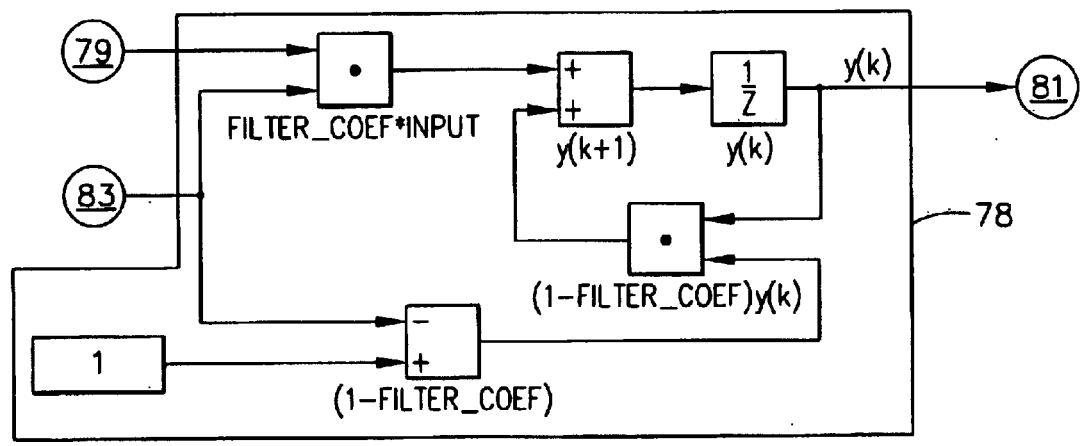
FIG. 4 is the filter of FIG. 3 in greater detail in accordance with a preferred exemplary embodiment of the present invention.

In accordance with a preferred exemplary embodiment of the present invention, the exhaust temperature is preferably filtered with a filter 78, which is preferably a first order lag filter that removes the high frequency components of the exhaust temperature. Referring to FIG. 4, the filter 78 is shown in greater detail in accordance with a preferred exemplary embodiment of the present invention. The filter 78 provides the following operation on the input provided at the filter input 79 to produce the filtered output at the filter output 81, which in this instance is the exhaust gas temperature output 36:

$$y(k)=(1-\text{Filter\_Coef})y(k-1)+(\text{Filter\_Coef})x(k) \quad (8)$$

where k is the integration step, x(k) is the input signal at the integration step, y(k) is the filtered input at the integration step, y(k-1) is the filtered input at the previous integration step, and Filter_Coef is the filter time constant received at the filter coefficient input 83.

Figure 5:
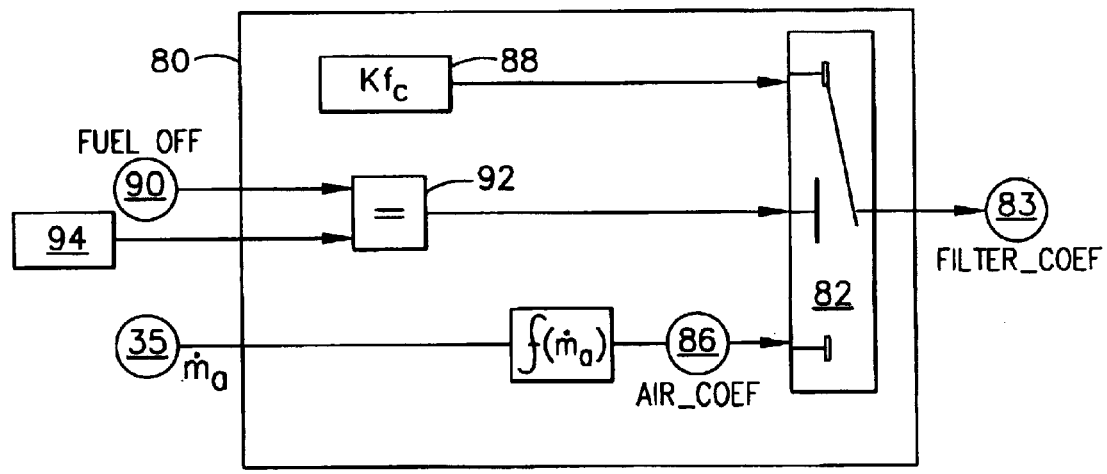
FIG. 5 is the time constant selector of FIG. 3 in greater detail in accordance with a preferred exemplary embodiment of the present invention.

Referring to FIG. 5, a time constant selector 80 for the filter 78 of shown in FIG. 4 is shown in greater detail. However, it should be understood that the filter time constant can be selected using other techniques and can also be based upon other criteria according to the present invention. The time constant selector 80 comprises a switch 82 that is configured to provide a first coefficient 86 or a second coefficient 88 as the filter time constant 83 based upon an evaluation of a fuel cut off indicator provided at the fuel cut off input 90. The first coefficient 86 is preferably an air coefficient (air_coef) that is a function of the air mass flow rate (i.e., air_coef=f($\dot{m}_a$)) and the second coefficient 88 is preferably a constant ($Kf_c$) that accounts for the effects introduced when the fuel supply to the engine is discontinued and the air mass flow rate is reduced to a minimum. As the fuel supply is discontinued and the air mass flow rate is reduced to a minimum, the exhaust temperature rapidly decreases and the second coefficient 88 preferably compensates for this rapid decrease.

The second coefficient 88 can be selected based upon a table lookup operation and the air coefficient is also preferably implemented using a table lookup operation, as the air coefficient is a non-linear function of the air mass flow rate. The lookup tables can be experimentally generated with techniques known to one of ordinary skill in the art. However, the lookup tables can be generated with other techniques, such as empirical calculation, or these non-linear functions can be determined using techniques other than lookup operations, such as periodic calculations, to account for the effects introduced with the cut off of the fuel.

According to a preferred embodiment, the fuel cut off indicator is evaluated by a comparator 92 that generates a signal to configured the switch 82 for selection of the first coefficient 86 if the fuel cut off indicator is not equal to a predetermined value 94 and configures the switch 82 for selection of the second coefficient if the fuel cut off indicator is equal to the predetermined value 94. However, any number of configurations can be used to provide the first coefficient 86 as the filter time constant 83 if a first condition exists and the second coefficient 88 as the filter time constant 83 if a second condition exists. As previously described in this detailed description of the drawings and with momentary reference to FIG. 3, the filter time constant is preferably used to filter the exhaust gas temperature ($T'_{exh}$) estimated by the exhaust gas temperature estimator 32, and the filtered exhaust gas temperature ($T_{exh}$) is preferably provided at the exhaust gas temperature output 36 and subsequently utilized for estimation of other gas temperatures.

Figure 6:
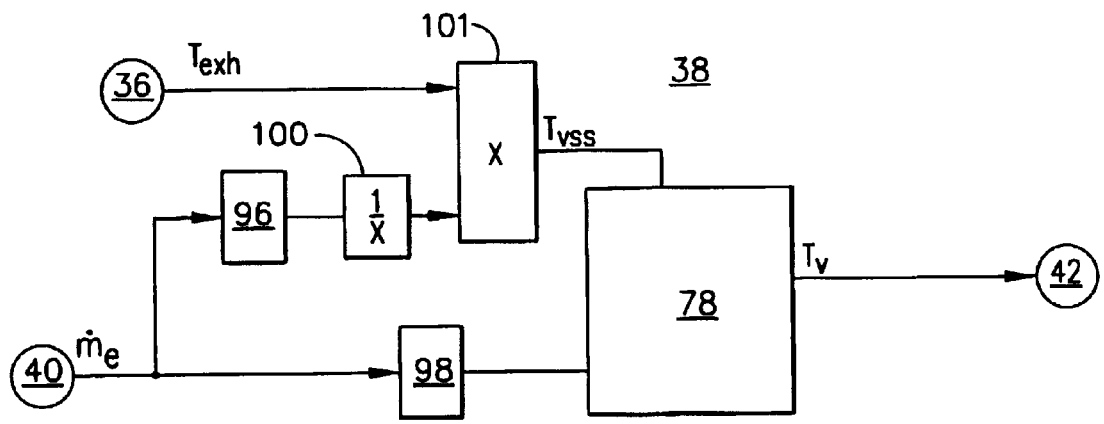
FIG. 6 is the first recirculated engine exhaust (EGR) gas temperature estimator of FIG. 2 in accordance with a preferred exemplary embodiment of the present invention.

Referring to FIG. 6, the first EGR temperature estimator 38 of FIG. 2 is illustrated in greater detail according to a preferred exemplary embodiment of the present invention. In addition, Appendix A provides derivation details for the first EGR gas temperature estimator 38 according to the preferred exemplary embodiment of the present invention. However, as can be appreciated by one of ordinary skill in the art, other configurations and/or embodiments of the first temperature estimator 38 can be used to estimate the EGR gas temperature at the EGR valve ($T_v$) based at least upon the exhaust gas temperature ($T_{exh}$) and the estimate of the EGR mass flow-rate ($\dot{m}_e$). The first EGR gas temperature estimator 38, which can be implemented with software, hardware, or a combination of hardware and software, comprises a first steady-state EGR temperature estimator 96 and a first EGR time constant determinator 98.

The first steady-state EGR temperature estimator 96 is configured to estimate the steady-state EGR temperature at the EGR valve and the first EGR time constant determinator 98 is configured to provide the filter time constant for the filter 78 as described with reference to FIG. 4, which is preferably a first order lag filter that removes the high frequency components of the EGR gas temperature at the EGR valve. The first steady-state EGR temperature estimator 96 and first EGR time constant determinator 98 are preferably lookup table operators that are used to determine the estimate of the steady-state EGR temperature at the EGR valve and the first EGR time constant, which are non-linear functions.

More specifically, the estimate of the steady-state EGR gas temperature at the EGR valve is a function of the EGR mass flow rate (i.e., $T_{vss}=f(\dot{m}_e)$), and the time filter constant produced by the first EGR time constant determinator 98 is also a function of the EGR mass flow rate (i.e., first EGR time constant=$f(\dot{m}_e)$). In accordance with a preferred embodiment of the present invention, the lookup tables for first steady-state EGR temperature estimator 96 and the first EGR time constant determinator 98 are experimentally generated with techniques known to one of ordinary skill in the art. However, the lookup tables can be generated with other techniques known to one of ordinary skill in the art such as empirical calculation.

Once the estimate of the steady-state EGR temperature at the EGR valve is determined according to the technique of a preferred exemplary embodiment of the present invention or according to any number of techniques known to one of ordinary skill in the art, the calculation of the EGR gas temperature of the EGR valve is conducted with an inverter 100 and multiplier 101 to perform the following mathematical operation as described in Appendix A:

$$T_{vss} \approx T_{exh} * \frac{1}{f_v(\dot{m}_e)} \tag{9}$$

In addition, once the first EGR time constant determinator 98 determines the filter time constant for the filter 78, the EGR gas temperature of the EGR valve is preferably filtered with the filter 78 and provided at the first EGR temperature output 42. Furthermore, the EGR gas temperature at the throttle body is similarly calculated and filtered in accordance with the present invention.

Figure 7:
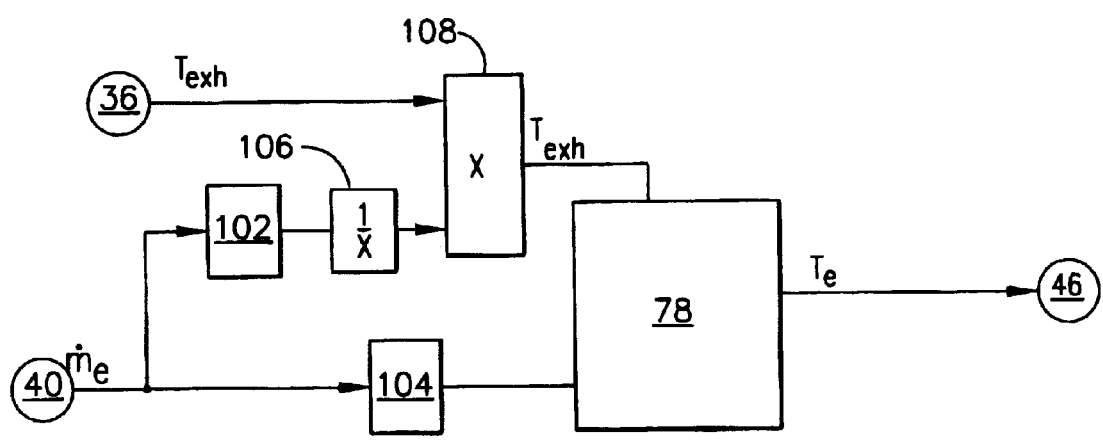
FIG. 7 is the second EGR gas temperature estimator of FIG. 2 in accordance with a preferred exemplary embodiment of the present invention.

More specifically, and with referring to FIG. 7, the second EGR temperature estimator 44 of FIG. 2 is illustrated in greater detail according to a preferred exemplary embodiment of the present invention. In addition, Appendix A provides derivation details for the second EGR gas temperature estimator 44 according to the preferred exemplary embodiment of the present invention. However, as can be appreciated by one of ordinary skill in the art, other configurations and/or embodiments of the second EGR gas temperature estimator 44 can be used to estimate the EGR gas temperature at the throttle body ($T_{ess}$) based at least upon the exhaust gas temperature ($T_{exh}$) and the estimate of the EGR mass flow-rate ($\dot{m}_e$). The second EGR gas temperature estimator 44, which can be implemented with software, hardware, or a combination of hardware and software, comprises a second steady-state EGR temperature estimator 102 and a second EGR time constant determinator 104.

The second steady-state EGR temperature estimator 102 is configured to estimate the steady-state EGR temperature at the throttle body and the second EGR time constant determinator 104 is configured to provide the filter time constant for the filter 78 as described with reference to FIG. 4, which is preferably a first order lag filter that removes the high frequency components of the EGR gas temperature at the throttle body. The second steady-state EGR temperature estimator 102 and second EGR time constant determinator 104 are preferably lookup table operators that are used to determine the estimate of the steady-state EGR temperature at the throttle body and the second EGR time constant, which are non-linear functions.

More specifically, the estimate of the steady-state EGR temperature at the throttle body that is produced by the second steady-state EGR temperature estimator 102 is a function of the EGR mass flow rate (i.e., $T_{ess}=f(\dot{m}_e)$), and the filter time constant produced by the second EGR time constant determinator 104 is also a function of the EGR mass flow rate (i.e., second EGR time constant=$f(\dot{m}_e)$). In accordance with a preferred embodiment of the present invention, the lookup tables for the second steady-state EGR temperature estimator 102 and second EGR time constant determinator 104 are experimentally generated with techniques known to one of ordinary skill in the art. However, the lookup tables can be generated with other techniques known to one of ordinary skill in the art such as empirical calculation.

Once the estimate of the steady-state EGR temperature at the throttle body is determined according to the technique of a preferred exemplary embodiment of the present invention or according to any number of techniques known to one of ordinary skill in the art, the calculation of the second EGR temperature is conducted with an inverter 106, and multiplier 108 to perform the following mathematical operation as discussed in Appendix B:

$$T_{css} \approx T_{exh} * \frac{1}{f(\dot{m}_e)} \tag{10}$$

In addition, once the second EGR time constant determinator 104 determines the filter time constant for the filter 78, the second EGR temperature is preferably filtered with the filter 78 and provided at the second EGR temperature output 46, and also provided as an input to the charge temperature estimator 48 as shown in FIG. 2.

Figure 8:
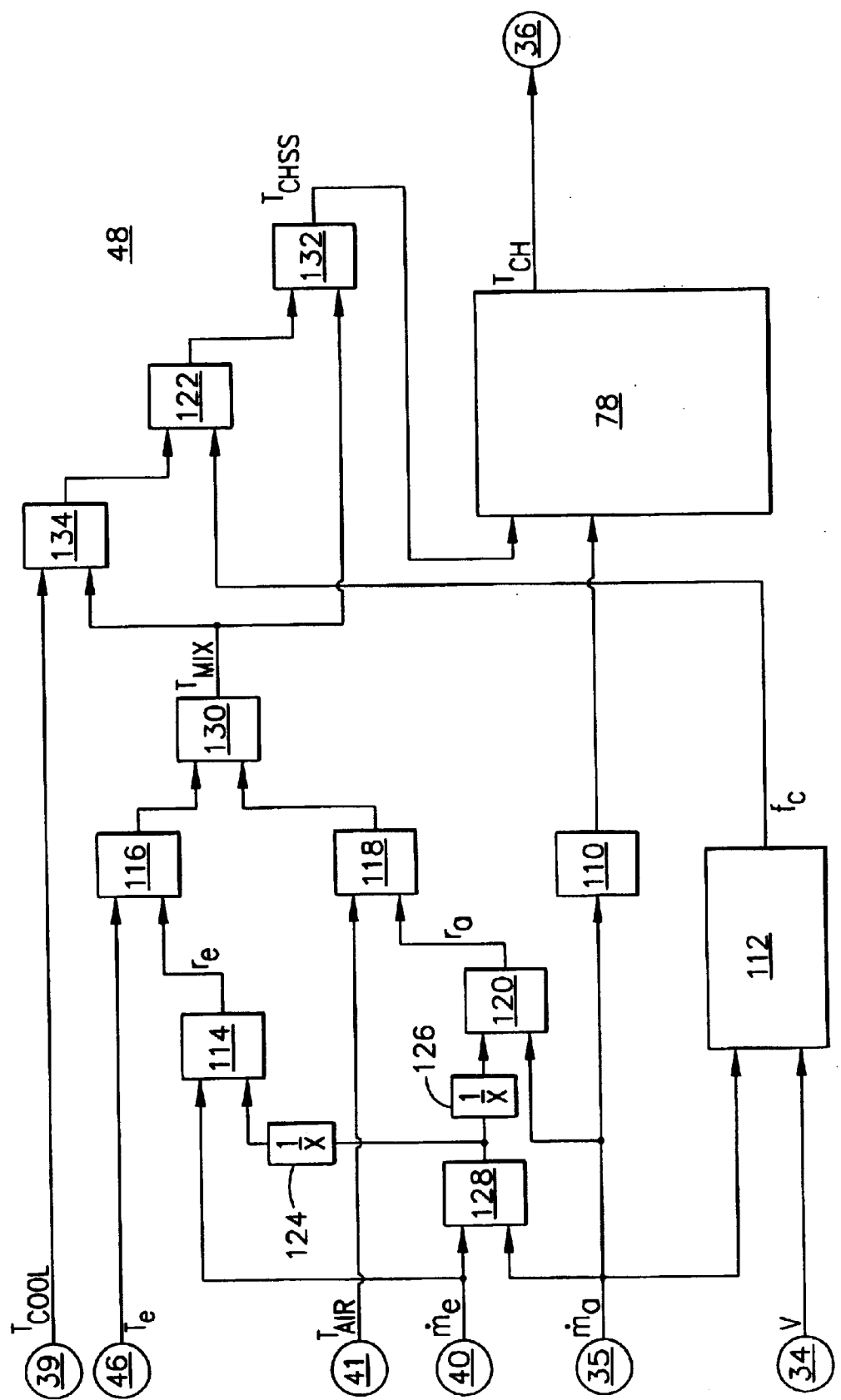
FIG. 8 is the charge temperature estimator of FIG. 2 in accordance with a preferred exemplary embodiment of the present invention.

Referring to FIG. 8, the charge temperature estimator 48 of FIG. 2 is illustrated in accordance with a preferred exemplary embodiment of the present invention. In addition, Appendix A provides derivation details for the charge temperature estimator 48 according to the preferred exemplary embodiment of the present invention. However, as can be appreciated by one of ordinary skill in the art, other configurations and/or embodiments of the charge temperature estimator 48 can be used to estimate the charge gas temperature ($T_{ch}$) based at least upon the EGR gas temperature at the throttle body ($T_e$), the velocity of the vehicle, and the estimate of the EGR mass flow rate, and preferably also based upon the engine coolant temperature, engine inlet temperature, the air mass flow rate and the velocity of the vehicle. The charge temperature estimator 48, which can be implemented with software, hardware, or a combination of hardware and software, comprises a charge time constant determinator 110, a coolant coefficient determinator 112, and multiple mathematical operators as subsequently described in this detailed description of the drawings.

The charge time constant determinator 110 is configured to determine the filter time constant for the filter 78, and the coolant coefficient determinator 112 is configured to determine the coolant coefficient ($f_c$) as a function of air mass flow rate and velocity of the vehicle (i.e., $f_c=f(\dot{m}_a,v)$). In addition, the multiple mathematical operators are configured to provide the following mathematical operation for calculation of the charge gas temperature:

$$T_{chss} \approx T_{mix} + f_c(T_{cool} - T_{mix}) \tag{11}$$

where: $T_{cool}$ is the coolant temperature, and:

$$T_{mix} = r_a T_{air} + r_e T_e \tag{12}$$

where: $T_{air}$ is the engine inlet temperature, $r_e$ is the EGR ratio set forth in equation (2), and $r_a$ is the air ratio provided in equation (13).

$$r_a = \frac{\dot{m}_a}{\dot{m}_a + \dot{m}_e} \tag{13}$$

The charge time constant determinator 110 and the coolant coefficient determinator 112 are preferably lookup table operators that are used to determine the filter time constant (Filter_Coef) and the coolant coefficient ($f_c$), respectively. More specifically, the filter time constant is a function of the air mass flow rate (i.e., Filter_Coeff=$f(\dot{m}_a)$), and the coolant coefficient is a function of the air mass flow rate and the velocity of the vehicle (i.e., $f_c=f(\dot{m}_a, v)$ as previously described in this detailed description of the drawings). In accordance with a preferred embodiment of the present invention, the lookup tables for charge time constant determinator 110 and the coolant coefficient determinator 112 are experimentally generated with techniques known to one of ordinary skill in the art. However, the lookup tables can be generated with other techniques known to one of ordinary skill in the art such as empirical calculation.

The variables from which the charge temperature estimator 48 estimates the charge gas temperature are a combination of measured values and calculated values from the measured values. The air mass flow rate, coolant temperature, inlet air temperature and the velocity of the vehicle are preferably measured with sensors as known by one of ordinary skill in the art. As previously described in this detailed description of the drawings, the EGR ratio and the air ratio are calculated from the air mass flow rate and the estimate of the EGR mass flow rate that can be estimated according to any number of techniques known to one of ordinary skill in the art or can be determined according to a technique of a preferred exemplary embodiment of the present invention as set forth in Appendix B.

Once the estimate of the EGR mass flow-rate, air mass flow rate, and coolant coefficient are determined as previously described in this detailed description of the drawings and the inlet air temperature and coolant temperature are provided at the inlet air temperature input 41 and the engine coolant temperature input 39, the calculation of the charge gas temperature is conducted with multipliers (114, 116, 118, 120, 122), inverters (124, 126), adders (128, 130, 132), and subtractors (134) to perform the mathematical operation set forth in equation (11). In addition, once the charge time constant determinator 110 determines the filter time constant for the filter 78, the charge gas temperature is preferably filtered with the filter 78 and provided at the charge gas temperature output 50. The charge gas temperature can be used individually or in combination with the exhaust gas temperature, EGR gas temperature at the EGR valve, and/or the EGR gas temperature at the throttle body for any number of purposes such as for use in an engine control strategy for controlling engine operating parameters (e.g., engine intake air and injected fuel) to balance engine-operating goals (e.g., low emissions, high fuel economy, and high engine performance.)

Figure 9:
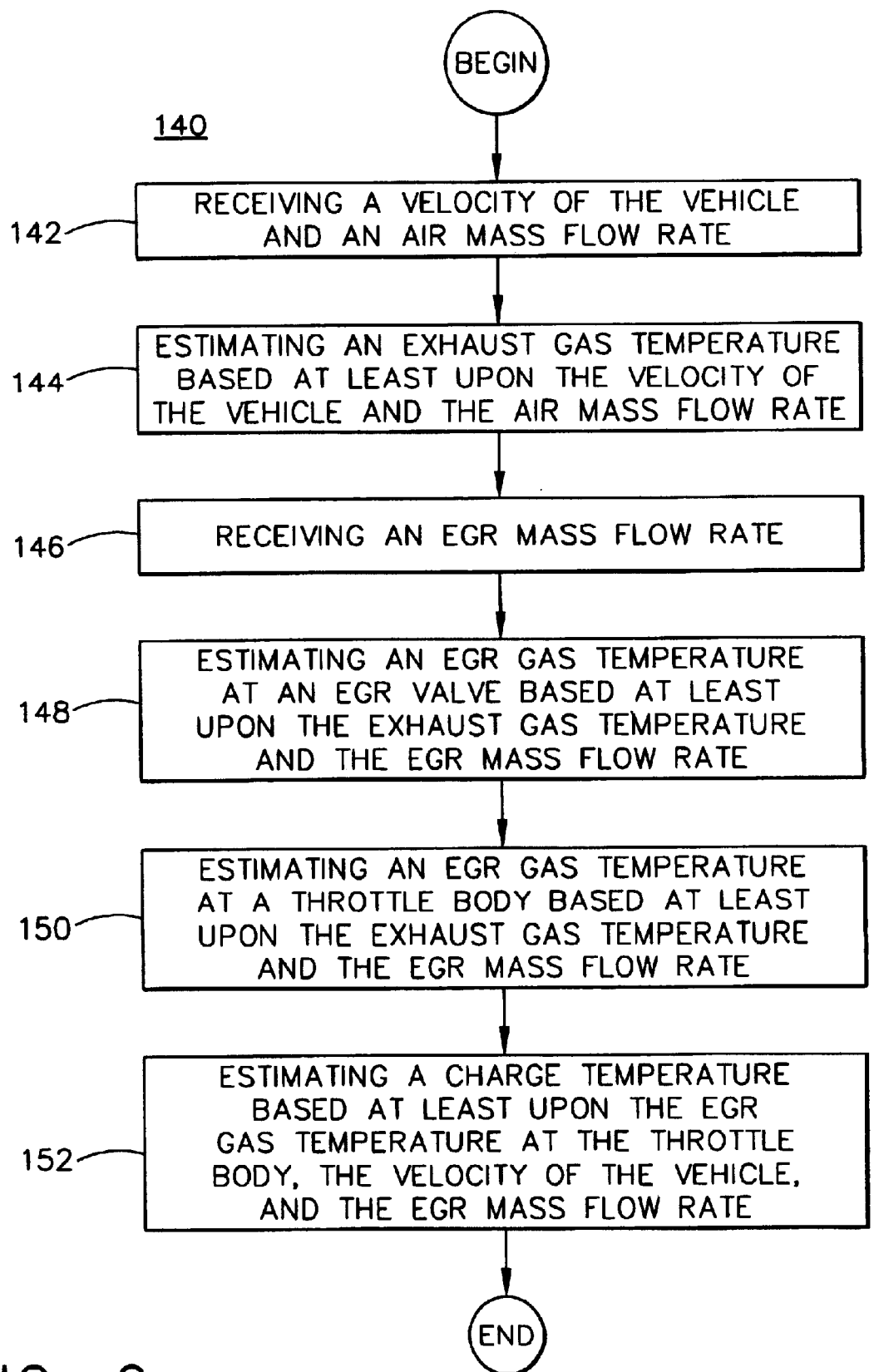
FIG. 9 is a flowchart illustrating the method for estimating the temperatures of an engine of a vehicle in accordance with a preferred exemplary embodiment of the present invention.

As can be appreciated by one of ordinary skill in the art, the apparatus 30 as shown in FIG. 2 and previously described in this detailed description of preferred embodiments provides numerous benefits, and the method for estimating a plurality of gas temperatures in an engine of a vehicle 140 as shown in FIG. 9, which can be performed with the apparatus or any other apparatus or combination of apparatuses, provides one or more of the benefits of the apparatus as well as other benefits as can be appreciated by one of ordinary skill in the art.

Referring to FIG. 9, the method for estimating a plurality of gas temperatures in an engine of a vehicle 140 is illustrated according to a preferred exemplary embodiment of the present invention. While the method 140 for estimated the plurality of gas temperatures is generally illustrated in FIG. 9, it should be understood that the actions, step, calculations, process, and procedures, which are expressed or implied during the description of the apparatus of the preferred exemplary embodiment, are within the scope of the method 140 of the present invention.

The method 140 comprises receiving a velocity of the vehicle and an air mass flow rate 142 and estimating an exhaust gas temperature based at least upon the velocity of the vehicle and the air mass flow rate 144. The method also comprises receiving an EGR mass flow rate 146 and estimating an EGR gas temperature at an EGR valve based at least upon the exhaust gas temperature and the EGR mass flow rate 148. In addition, the method comprises estimating an EGR gas temperature at a throttle body based at least upon the exhaust gas temperature and the EGR mass flow rate 150. Furthermore, the method comprises estimating a charge temperature based at least upon the EGR gas temperature at the throttle body, the velocity of the vehicle, and the EGR mass flow rate 152.

Figure 10:
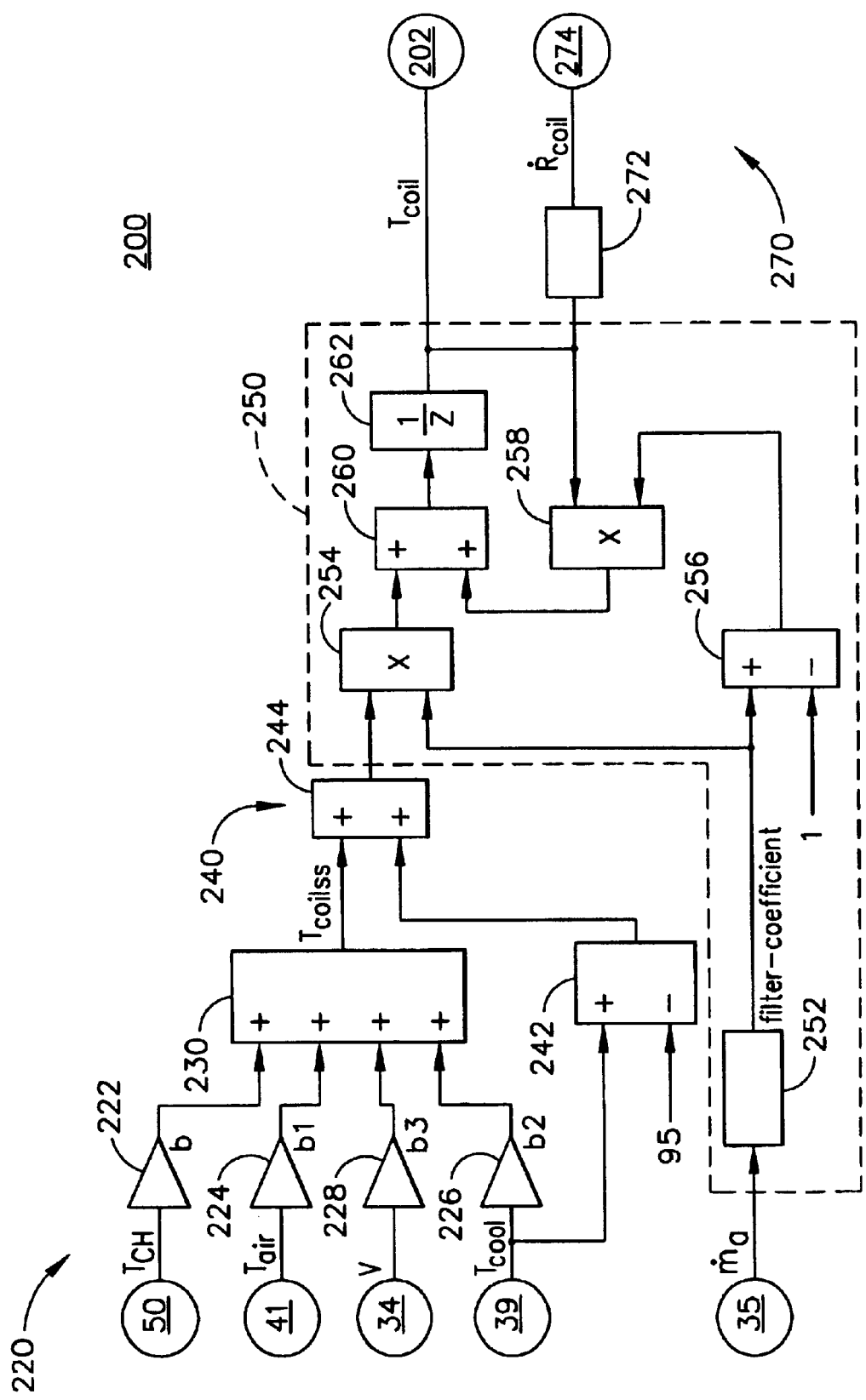
FIG. 10 is the EGR coil temperature estimator of FIG. 2 in accordance with a preferred exemplary embodiment of the present invention.

Referring to FIG. 10, the EGR valve coil temperature estimator 200 of FIG. 2 is illustrated in greater detail according to a preferred exemplary embodiment of the present invention. The instantaneous estimated EGR valve coil temperature $T_{coil}$ is derived using both a steady-state estimate and a correction for transient conditions. The modified steady-state estimate is then smoothed using a smoothing filter.

The steady-state EGR valve coil temperature $T_{coilss}$ is preferably inferred primarily from three variables: the charge temperature $T_{CH}$, the engine inlet air temperature $T_{air}$, and the coolant temperature $T_{cool}$. Information about engine inlet air temperature and coolant temperature is already available from existing sensors. Information about charge temperature, however, is preferably estimated from existing sensors as described in FIGS. 1–9. In addition to these three variables, vehicle speed v is used to improve the accuracy of the model and account for the effect of the wind when the vehicle is moving.

A complete mathematical description of the behavior of the EGR valve coil temperature would require a very complex and non-linear differential equation. However, the steady-state coil temperature equation has been simplified to make it possible to implement the algorithm in the PCM 328:

$$T_{coilss} = f(T_{CH}, T_{air}, T_{cool}, v) \quad (14)$$

wherein the function operator f( ) is a linear expression of the charge, engine air inlet, and coolant temperatures and vehicle speed, namely:

$$T_{coilss} = b^*T_{CH} + b1^* T_{air} + b2^* T_{cool} + b3^*v \quad (15)$$

and wherein b, b1, b2, and b3 are coefficients of the model.

Thus, as illustrated in FIG. 10 temperature estimation algorithm 200 has a steady-state portion 220, a transient portion 240, a smoothing filter 250, and a resistance calculation portion 270. Steady-state portion 220 forms the value $T_{coilss}$ and includes multiplication elements 222, 224, 226, and 228, and a summing device 230. Multiplication element 222 has an input coupled to input 50 for receiving the charge estimate $T_{CH}$, and an output, and has coefficient b associated therewith. Multiplication element 224 has an input coupled to input 41 for receiving the air temperature $T_{air}$, and an output, and has coefficient b1 associated therewith. Multiplication element 226 has an input coupled to input 39 for receiving the coolant temperature $T_{cool}$, and an output, and has coefficient b2 associated therewith. Multiplication element 228 has an input coupled to input 34 for receiving the vehicle speed v, and an output, and has coefficient b3 associated therewith. Summing device 230 has four inputs for receiving the respective outputs of multiplication elements 222, 224, 226, and 228, and an output for providing signal $T_{coilss}$.

Transient portion 240 includes a subtractor 242 and a summing device 244. Subtractor 242 has a positive input for receiving $T_{cool}$, a negative input for receiving the value 95, and output for providing a difference thereof equal to $T_{cool}$–95. Summing device 244 has a first input coupled to the output of summing device 230, a second input coupled to the output of subtractor 242, and an output for providing an intermediate EGR valve coil temperature estimate labeled "$T_{coili}$".

Filter 250 includes a lookup table 252, a multiplication element 254, a subtractor 256, a multiplication device 258, a summing device 260, and a delay element 262. Lookup table 252 has an input coupled to input 35 for receiving the mass air flow estimate $\dot{m}_a$, and an output, and is a lookup table that provides a value labeled "filter_coefficient" for digital filter 250 at the output thereof. In calibrating the model as described below the inventors used a value of 0.005 for the filter coefficient for all mass air flow rates. However the inventors believe that the transient response is a function of mass air flow and the filter_coefficient should preferably vary accordingly. Multiplication device 254 has a first input coupled to the output of summing device 244, a second input connected to the output of lookup table 252, and an output. Subtractor 256 has a first input connected to the output of lookup table 252, a second input for receiving the value 1, and an output. Multiplication device 258 has a first input, a second input coupled to the output of subtractor 256, and an output. Summing device 260 has a first input coupled to the output of multiplication device 254, a second input coupled to the output of multiplication device 258, and an output. Delay element 262 has an input coupled to the output of summing device 260, and an output coupled to the first input of multiplication device 258 and to output node 202 for providing signal $T_{coil}$ thereto.

Smoothing filter 250 is as a first order lag filter that uses history to make the next coil temperature estimate. Mathematically:

$$T_{coil}(k+1) = \text{filter\_coefficient}^*T_{coili}(k+1) + (1-\text{filter\_coefficient})^*T_{coili}(k) \quad (16)$$

where k is a given point in time and k+1 is the next subsequent point in time.

Resistance calculation portion 270 includes a resistance calculation block 272 and an output 274. Resistance calculation block 272 has an input for receiving $T_{coil}$, and an output coupled to output 274 for providing an estimate of the resistance labeled $\dot{R}_{coil}$. The resistance is estimated using a formula expressing the resistance of the copper coil windings as a function of temperature, namely:

$$\dot{R}_{coil} = 8.3^*(0.0039^*(T_{coil}-20)+1) \quad (17)$$

In general the values of the coefficients used in the model can be obtained from test data on an actual engine. The inventors performed tests on a prototype vehicle engine and measured EGR valve coil temperature by placing a thermocouple inside the EGR valve coil. Likewise, the actual charge temperature was measured by placing a thermocouple at the inlet port. The engine inlet air and coolant temperatures were measured from production sensors already present in the engine.

The inventors discovered that EGR valve coil temperature was highly correlated with charge temperature under steady-state conditions, i.e., with the engine warmed up and nearly constant vehicle speed and inlet air/EGR mass air flow. There was also a good correlation between EGR valve coil temperature and engine inlet air temperature. The correlation between EGR valve coil temperature and coolant temperature appeared to be weak but coolant temperature was found to provide useful information during transient conditions. The inventors obtained values for b, b1, b2, and b3 by regression analysis using least-mean-squares as a measure of best-fit. It should be apparent that the actual values obtained for b, b1, b2, and b3, as well as the 95 degree transient adjustment temperature and filter_coefficient value will be a function of the characteristics of the engine and will vary from engine to engine.

To determine the validity of the model, the inventors analyzed the difference between the actual temperature and the predicted temperature. The range was for vehicle speed from idle to 75 miles per hour (MPH), air mass flow rate from 4 grams/second to 40 grams/second, engine inlet air temperature ranging from 0° Celsius to 60° Celsius, and coolant temperature ranging from 70° Celsius to 105° Celsius. The inventors found that the model predicted the EGR coil temperature with an error of less than about 10° Celsius. It is believed that if the model were further calibrated it would be possible to obtain a prediction error under ±10° Celsius.

From the foregoing detailed description of preferred exemplary embodiments, it should be appreciated that apparatus and methods are provided for estimating EGR valve coil temperature within an engine of a vehicle. While the invention has been described in the context of preferred embodiments, various modifications will be apparent to those skilled in the art. For example, the EGR valve coil estimation technique may be implemented in hardware, in software, or in some combination of the two. Furthermore the coefficients actually used in the model will vary based on the characteristics of the particular engine. Accordingly, it is intended by the appended claims to cover all modifications of the invention which fall within the true scope of the invention.

APPENDIX A

DERIVATION DETAILS FOR THE APPARATUS AND METHODS

OF THE PRESENT INVENTION

From the law of conservation of energy, the rate of heat transfer to the gas in the intake manifold is as follows:

$$\text{Rate of heat transfer to the gas} = \delta q = \dot{m} c_p (T_{ch,z+\Delta z} - T_{ch,z}) \quad (1)$$

where: $\delta q$ is rate heat transfer to the gas, $\dot{m}$=air and EGR gas flow rates, $c_p$ is the specific heat at constant pressure, $T_{ch,z+\Delta z}$ is the temperature of the gas at $z+\Delta z$, and $T_{ch,z}$ is the temperature of the gas at z.

The rate of heat transfer to the gas in the intake manifold can also be expressed as follows:

$$\delta q = h \Delta A_s (T_s - T_{ch}) \quad (2)$$

where: h is the average heat transfer coefficient, $A_s$ is the surface area, $T_s$ is the surface temperature, and $T_{ch}$ is the temperature of the charge in relatively close proximity to intake port.

Combining equations (1) and (2) provides the following:

$$\dot{m} c_p (T_{ch,z+\Delta z} - T_{ch}) \quad (3)$$

where equation (3) can be written as:

$$\dot{m} c_p \frac{dT_{ch}}{dz} = h \frac{dA_s}{dz}(T_s - T_{ch}) \quad (4)$$

Integrating equation (4) provides:

$$\int_{in}^{out} \frac{dT_{ch}}{T_s - T_{ch}} = \int_0^{A_s} \frac{h}{\dot{m}c} dA_s \quad (5)$$

After the integration of equation (5), and with $T_{ch,in}=T_{mix}$ and $T_{ch,out}=T_{ch}$, the following relationship exists:

$$T_{ch} = T_s - (T_s - T_{mix})e^{\frac{hA_s}{\dot{m}c_p}} \quad (6)$$

where: $T_{mix}$ is the temperature of the air and EGR mixture. Mathematically manipulating equation (6) provides:

$$T_{ch} = T_{mix} e^{\frac{hA_s}{\dot{m}c_p}} + T_s\left(1 - e^{\frac{hA_s}{\dot{m}c_p}}\right) \quad (7)$$

Furthermore, adding $T_{mix}$ to each term of the equality presented in equation (7) provides the following:

$$T_{ch} + T_{mix} = T_{mix} + T_{mix} e^{\frac{hA_s}{\dot{m}c_p}} + T_s\left(1 - e^{\frac{hA_s}{\dot{m}c_p}}\right) \quad (8)$$

Equation (8) can be written as:

$$T_{ch} = T_{mix} - T_{mix} + T_{mix} e^{\frac{hA_s}{\dot{m}c_p}} + T_s\left(1 - e^{\frac{hA_s}{\dot{m}c_p}}\right) \quad (9)$$

Finally, the following expression for the temperature of the charge can be determined from the expression of equation (9) as follows:

$$T_{ch} = T_{mix} + \left(1 - e^{\frac{hA_s}{\dot{m}c_p}}\right)(T_s - T_{mix}) \quad (10)$$

From equation (10) it can be appreciated that at high airflow rates, the temperature of the charge ($T_{ch}$) is approximately equal to the temperature of the air and EGR mixture (i.e., $T_{ch} \cong T_{mix}$). As can be appreciated, the coolant temperature ($T_{cool}$) can be used to provide an estimation of the surface temperature ($T_s$) in equation (10), which provides the following relationship:

$$T_{ch} \approx T_{mix} + f_c(T_{cool} - T_{mix}) \quad 11)$$

where $f_c$ is the coolant coefficient, representing effects such as the effect of vehicle speed on temperature, air flow and coolant temperature experimentally generated under various operating conditions of the vehicle.

From equations (10) and (11), the following expression for $f_c$ can be determined as follows:

$$f_c \propto 1 - e^{\frac{hA_s}{\dot{m}c_p}} \quad (12)$$

However, $f_c$ is also a function of engine speed (N), that is:

$$f_c = f(\dot{m}, N) \quad (13)$$

Therefore, $f_c$ can be approximated with the following non-linear equation:

$$f_c = C_1 + C_2 e^{\frac{hA_s}{\dot{m}c_p}} \quad (14)$$

where the coefficients $C_1$ and $C_2$ are functions of engine speed. However, equation (23) does not capture the effect of the airflow over the engine when a vehicle is moving at different speeds. Therefore, to account for this effect of the wind when the vehicle is moving at different speeds, equation (13) can be written as:

$$f_c = f(\dot{m}, N, mph) \quad (15)$$

where mph is the vehicle speed (i.e., velocity of the vehicle) in Miles Per Hour. Since the vehicle speed is a function of engine speed, and in order to simplify the implementation of $f_c$, equation (15) can be written as:

$$f_c = f(\dot{m}, mph) \quad (16)$$

It can be shown that equation (13) is a special case of equation (16). When the vehicle is at idle, equation (16) reduces to equation (13) because the vehicle speed is zero, and equation (16) can be implemented using a 2-D table look-up operation.

Charge Temperature When The EGR Valve Is Closed

Steady State Conditions

Steady state conditions are defined herein as those conditions at which the engine speed and air mass flow are substantially constant or constant. Under steady state conditions, equation (11) can be rewritten as:

$$T_{chss} \approx T_{mix} + f_c(T_{cool} - T_{mix}) \quad (b\ 17)$$

where $T_{chss}$ is the temperature of the charge at steady state conditions. When the EGR valve is closed, the temperature of the air and EGR mixture ($T_{mix}$) is equal to the temperature of the incoming air(i.e., $T_{mix=Tair}$). In addition, when the EGR valve is closed, the gas flow rate into the intake manifold is the air mass flow rate (i.e., $\dot{m}=\dot{m}_a$).

Transient Conditions with the EGR Valve Closed

Under transient conditions, the temperature of the charge changes with time as a result of changes in vehicle speed and air mass flow rate. During these conditions, the temperature of the charge can be described by the following differential equation:

$$\dot{T}_{ch}=aT_{ch}+b_1 T_{chss} \tag{18}$$

where $T_{ch}$ is the instantaneous charge temperature of the coefficients (i.e., a and $b_1$) are functions of the operating conditions of the engine. Equation (18) can be rewritten in discrete form as follows:

$$T_{ch}(k+1)=a_d T_{ch}(k)+b_{1\ d}T_{chss}(k) \tag{19}$$

A special case of equation (19) is that in which $a_d=1-b_{1d}$, therefore:

$$T_{ch}(k+1)=(1-b_{1d}T_{chss}(k)) \tag{20}$$

By using equation (20) rather that equation (18), the number of coefficients can be reduced from two to one and this also increases the probability tht the steady-state gain is unity.

Accounting For EGR In The Intake Manifold

The temperature of the manifold inlet gas is not just a function of the inlet air temperature with an open EGR valve. Rather, it is also a function of the temperature of EGR at the throttle, and the EGR percent in the intake manifold. The temperature of the manifold inlet gas can be expressed as follows:

$$T_{mix}=r_a T_{air}+r_e T_e \tag{21}$$

where the temperature of the inlet air ($T_{air}$) is obtained from a production sensor, $T_e$ is the EGR temperature at the throttle body, $r_a$ and $r_e$ are the air and EGR ratios given by equation (22) and equation (23as follows:

$$r_a = \frac{\dot{m}_a}{\dot{m}_a + \dot{m}_e} \tag{22}$$

$$r_e = \frac{\dot{m}_e}{\dot{m}_a + \dot{m}_e} \tag{23}$$

$T_e$ is preferably estimated in accordance with the present invention, and can be expressed as a function of EGR mass flow, exhaust, coolant, and inlet air temperatures as follows:

$$T_e=f(\dot{m}_e, T_{exh}, T_{air}, \dot{m}_{air}) \tag{24}$$

Equation (24) can be simplified by assuming that the main effects on the temperature of EGR at the throttle body are those due to $\dot{m}_e$ and $T_{exh}$. Under this assumption, equation (24) reduces to:

$$T_e=f(\dot{m}_e, T_{exh}) \tag{25}$$

In equation (25), $T_{exh}$ is obtained from the exhaust temperature estimator. In addition, to estimate the temperature of the charge in the presence of EGR, the EGR mass flow rate through the EGR valve ($\dot{m}_e$) is estimated in accordance with the present invention as set forth in Appendix B.

Estimation Of The EGR Temperature At The Throttle Body

The EGR temperature at the throttle body is preferably estimated at steady state and transient conditions, with the system in a steady state condition when the engine speed, air, and EGR flows are substantially constant or constant.

EGR Temperature Estimation at Steady State Conditions

As previously discussed in this Appendix A, the EGR temperature at the throttle body is a function of the exhaust temperature and the EGR mass flow rate. Therefore, the steady-state EGR temperature at the throttle body can be expressed as follows:

$$T_{ess} \approx T_{exh} * \frac{1}{f(\dot{m}_e)} \tag{26}$$

where $T_{ess}$ is the EGR temperature at the throttle body at steady state conditions and $f(\dot{m}_e)$ is given by the following non-linear equation:

$$f(\dot{m}_e) = C_{e1} + C_{e2}e^{\frac{hA_s}{\dot{m}c_p}} \tag{27}$$

As can be appreciated, equation (27) can be implemented using a one-dimensional table look-up operation.

EGR Temperature Estimation during Transient Conditions

During transient conditions, the EGR temperature at the throttle body can be expressed as $$T_e(k+1)=a_e T_e(k)+b_{1\ e}T_{ess}(k) \tag{28}$$

where $T_{ess}$ is given by equation (26) and $T_e$ is the instantaneous temperature of EGR at the throttle body. The coefficients (i.e., $a_e$ and $b_{1\ e}$) are functions of the EGR mass flow rate. Since $a_e=1-b_{1\ e}$, one coefficient is preferably utilized as a function of EGR flow.

Exhaust Temperature Estimation

The exhaust temperature is preferably estimated using the following equations:

$$T_{exss}=f(\dot{m}_a, mph, \text{Spark}, \dot{m}_e) \tag{29}$$

At constant spark and with the EGR valve in a closed position, equation (29) can be written as:

$$T_{exss}=f(\dot{m}_a, mph) \tag{30}$$

Equation (30) is preferably implemented using a two-dimensional table look-up operation. To obtain the final steady-state exhaust temperature, the output of this table is modified by spark and EGR mass flow rate. Therefore:

$$T_{exss}=f(\dot{m}_a, mph) +f(r_e, mph) \tag{31}$$

where $r_e$ is the EGR ratio, f(Spark) represents the effect of the spark deviation from MBT on the exhaust temperature, and $f(r_e, mph)$ represents the effect of EGR on the exhaust temperature.

During transient conditions, the exhaust temperature is preferably obtained from the following discrete equation:

$$T_{ex}(k+1)=a_{ex}T_{ex}(k)+b_{1\ ex}T_{exss}(k) \tag{32}$$

In addition to the variables shown in equation (29), the fuel base pulse width (BPW) is preferably used during fuel cut-off to modify the coefficients in equation (32). The coefficients $a_{e\_x}$ and $b_{1ex}$ are preferably obtained from the minimization of the error between measured and estimated exhaust temperature during transient conditions.

Estimation of the EGR Temperature at the EGR Valve

The temperature of the gases at the EGR valve is utilized in the determination of the EGR mass flow rate through the EGR valve. Since it is desirable to determine this information without the use of a production sensor, an estimate is determined from other measured or estimated variables. The EGR temperature at the EGR valve, under steady state conditions, can be described by $$T_{vss} \approx T_{exh} * \frac{1}{f_v(\dot{m}_e)} \quad (33)$$

where $T_{vss}$ is the EGR temperature at the EGR valve at steady state conditions and $f_{v(\dot{m}_e)}$ is given by the following non-linear equation:

$$f_v(\dot{m}_e) = C_{v1} + C_{v2} e^{\frac{hA_s}{\dot{m}_c c_p}} \quad (34)$$

As can be appreciated, equation (34) can be implemented with a one-dimension table look-up operation.

EGR Temperature at the EGR Valve during Transient Conditions

During transient conditions, the EGR temperature at the EGR valve can be expressed as:

$$T_v(k+1) = a_v T_v(k) + b_{1\,v} T_{vss}(k) \quad (35)$$

where $T_{vss}$ is given by equation (33) and $T_v$ is the instantaneous temperature of EGR at the EGR valve. The coefficients (i.e., $a_v$ and $b_{1\,v}$) are functions of the EGR mass flow rate. Since $a_v = 1 - b_{1\,v}$, coefficient is preferably utilized as a function of EGR flow.

APPENDIX B

ESTIMATION OF THE EGR MASS FLOW RATE

The gas mass flow rate through the EGR valve ($\dot{m}_e$) can be estimated using the following expression:

$$\dot{m}_e = A_{ef} * \frac{p_{exh}}{\sqrt{R * T_{exh}}} * \varphi \quad (1)$$

where:

$$\varphi = \begin{cases} 0.685 & \text{if } p_r < 0.53 \\ \frac{2 * k_c}{(k_c - 1)} * (p_r^{2/k_c} - p_r^{(k_c+1)/k_c}) & \text{if } p_r > 0.53 \end{cases} \quad (2)$$

where:

$$p_r = \frac{p_{mv}}{p_{exh}},$$

$p_m$ is the EGR valve downstream pressure, and $p_{exh}$ is EGR valve upstream pressure. The assumption is made that the EGR valve downstream pressure is equal to the manifold absolute pressure (MAP) and the upstream pressure is given by:

$$p_{exh} = \text{Baro} + \text{offset} \quad (3)$$

where: offset=$f(\dot{m}_a)$. In addition, $$k_c = \frac{c_p}{c_v}$$

is ratio of heat capacities, R is the ideal gas constant, and $A_{ef}$ is the effective valve area, which is given by:

$$A_{ef} = c_d * A_v \quad (4)$$

where: $A_v$ is the area of the valve and a function of the EGR valve position ($x_p$) (i.e., $A_v = A_v(x_p)$) and $c_d$ is the discharge coefficient of the valve.

What is claimed is:

1. A method for estimating a temperature of a coil of an exhaust gas recirculation (EGR) valve in an engine of a vehicle, comprising the steps of:
   receiving a charge temperature estimate;
   receiving an engine inlet air temperature;
   receiving a coolant temperature;
   forming a steady-state EGR valve coil temperature estimate as a linear function of said charge temperature estimate, said engine inlet air temperature, and said coolant temperature;
   determining a desired displacement of the exhaust gas recirculation valve;
   calculating a drive signal based on said desired displacement and said EGR valve coil resistance estimate; and
   driving the coil of the EGR valve using said drive signal.

2. The method of claim 1 further comprising the step of receiving a vehicle velocity, and wherein the step of forming said steady-state EGR valve coil temperature estimate further comprises forming said steady-state EGR valve coil temperature estimate as a linear function of said charge temperature, said engine inlet air temperature, said coolant temperature, and said vehicle velocity.

3. The method of claim 1 wherein said step of forming comprises the steps of:
   multiplying said charge temperature estimate by a first coefficient to form an adjusted charge temperature estimate;
   multiplying said engine inlet air temperature by a second coefficient to form an adjusted engine inlet air temperature;
   multiplying said coolant temperature by a third coefficient to form an adjusted coolant temperature; and
   summing said adjusted charge temperature, said adjusted engine inlet air temperature, and said adjusted coolant temperature to provide said steady-state EGR, valve coil temperature estimate.

4. The method of claim 3 further comprising the step of receiving a vehicle velocity, wherein said step of forming further comprises the step of multiplying said vehicle velocity by a fourth coefficient to form an adjusted vehicle velocity, and wherein the step of summing further comprises summing said adjusted charge temperature, said adjusted engine inlet air temperature, said adjusted coolant temperature, and said adjusted vehicle velocity to provide said steady-state EGR valve coil temperature estimate.

5. The method of claim 1 wherein said step of forming further comprises the step of modifying said steady-state EGR valve coil temperature estimate by a difference between said coolant temperature and a predetermined temperature to form an intermediate EGR valve coil temperature estimate.

6. The method of claim 1 further comprising the step of forming an instantaneous EGR valve coil temperature estimate by filtering said steady-state EGR valve coil temperature estimate using a smoothing filter.

7. The method of claim 6 wherein the step of filtering comprises the step of filtering said steady-state estimate using a smoothing filter coefficient determined by an air mass flow rate estimate.

8. The method of claim 6 further comprising the steps of calculating an EGR valve coil resistance estimate using said instantaneous EGR valve coil temperature estimate.

9. A method for estimating a temperature of a coil of an exhaust gas recirculation (EGR) valve in an engine of a vehicle, comprising the steps of:

measuring a plurality of temperatures in the vehicle including at least an engine inlet air temperature, a coolant temperature, and the temperature of the coil of the EGR valve;

determining a first coefficient representative of a degree of association between said engine inlet air temperature and the temperature of the coil of the EGR valve as said engine inlet air temperature vanes;

determining a second coefficient representative of a degree of association between said coolant temperature and the temperature of the coil of the EGR valve as said coolant temperature varies;

determining a third coefficient representative of a degree of association between a charge temperature and the temperature of the coil of the EGR valve as said charge temperature varies; and forming a steady-state EGR valve coil temperature estimate as a sum of said engine inlet air temperature multiplied by said first coefficient, said coolant temperature multiplied by said second coefficient, and said charge temperature multiplied by said third coefficient.

10. A The method of claim 9 wherein the step of measuring further comprises the step of measuring said charge temperature during said step of determining said third coefficient and estimating said charge temperature during said step of forming.

11. The method of claim 9 wherein the step of measuring further comprising the steps of:

measuring a vehicle velocity; and determining a fourth coefficient representative of a degree of association between said vehicle velocity and the temperature of the coil of the EGR valve as said vehicle velocity varies;

and wherein said step of forming further comprising the step of forming said steady-state EGR valve coil temperature estimate as a sum of said engine inlet air temperature multiplied by said first coefficient, said coolant temperature multiplied by said second coefficient, said charge temperature multiplied by said third coefficient, and said vehicle velocity multiplied by said fourth coefficient.

12. The method of claim 9 further comprising the step of compensating said steady-state EGR valve coil temperature estimate for transient conditions to form an intermediate EGR valve coil temperature estimate.

13. The method of claim 9 further comprising the step of forming an instantaneous EGR valve coil temperature estimate by filtering said steady-state EGR valve coil temperature estimate using a smoothing filter.

14. The method of claim 13 wherein the step of forming said instantaneous EGR valve coil temperature estimate comprises the step of providing a smoothing filter coefficient for said smoothing filter determined by an air mass flow rate estimate.

15. The method of claim 11 further comprising the step of calculating an EGR valve coil resistance estimate using said instantaneous EGR valve coil temperature estimate.

16. An apparatus for estimating a temperature of a coil of an exhaust gas recirculation (EGR) valve in an engine of a vehicle, comprising:

a first multiplication element having an input for receiving a charge temperature estimate, and an output, and having a first coefficient associated therewith;

a second multiplication element having an input for receiving an engine inlet air temperature, and an output, and having a second coefficient associated therewith;

a third multiplication element having an input for receiving a coolant temperature, and an output, and having a third coefficient associated therewith; and a summing device having a first input coupled to said output of said first multiplication element, a second input coupled to said output of said second multiplication element, a third input coupled to said output of said third multiplication element, and an output for providing a steady-state EGR valve coil temperature estimate.

17. The apparatus of claim 16 further comprising a fourth multiplication element having an input for receiving a vehicle velocity, and an output, and having a fourth coefficient associated therewith, and wherein said summing device further has a fourth input coupled to the output of the fourth multiplication element.

18. The apparatus of claim 16 further comprising a transient adjustment portion having a first input coupled to said output of said summing device, a second input for receiving said coolant temperature, and an output for providing an intermediate EGR valve coil temperature estimate.

19. The apparatus of claim 16 further comprising a smoothing filter having a first input coupled to said output of said transient adjustment portion, and an output for providing an instantaneous EGR valve coil temperature estimate.

* * * * *